United States Patent

[11] 3,631,519

| [72] | Inventor | Hooshang Salahshourian<br>Fairfield, Conn. |
| --- | --- | --- |
| [21] | Appl. No. | 99,799 |
| [22] | Filed | Dec. 21, 1970 |
| [45] | Patented | Dec. 28, 1971 |
| [73] | Assignee | General Electric Company |

[54] STRESS GRADED CABLE TERMINATION
9 Claims, 3 Drawing Figs.

[52] U.S. Cl..................................................... 174/73 R,
174/127, 324/54
[51] Int. Cl..................................................... H02g 15/02,
G01r 31/12
[50] Field of Search........................................ 174/73 R,
73 SC, 127; 310/196; 324/54

[56] References Cited
UNITED STATES PATENTS

| 3,210,460 | 10/1965 | Suelmann..................... | 174/73 R |
| --- | --- | --- | --- |
| 3,349,164 | 10/1967 | Wyatt........................... | 174/73 R |
| 3,396,231 | 8/1968 | Anderson...................... | 174/73 R |

*Primary Examiner*—Laramie E. Askin
*Attorneys*—R. Jonathan, R. Jonathan Peters, David M. Schiller, Frank L. Neuhauser, Oscar B. Waddell and Joseph B. Forman ABSTRACT: Electric cable terminating means for substantially inhibiting ionization at the termini in which a semiconductive coating having a nonlinear current characteristic is applied onto the insulation layer for a predetermined length between the high-voltage output end and the ground shielding means. A conductive coating is applied at opposite ends of the semiconductive coating onto the insulation layer to the high-voltage output end and to the ground shielding means to establish electrical contact. The semiconductive coating is of sufficient resistivity such that upon application of voltage the electrical stress at the surface for said length does not exceed the ionization start level of the cable.

PATENTED DEC 28 1971　　　　　　　　　　　3,631,519

Inventor
Hooshang Salahshourian

By K. Jonathan Peters
Attorney

STRESS GRADED CABLE TERMINATION

This invention relates to cable terminating means. In its more specific aspect, this invention relates to a method for substantially eliminating or inhibiting ionization at the terminus of a cable.

In a typical high-voltage cable, a semiconducting layer or tape is applied around the metal conductor, and an insulation layer is extruded over this surface. A ground shielding means is then concentrically disposed over the insulation, which usually comprises a semiconducting layer and a metallic return shield. The semiconducting layer, for example, may be a nylon tape impregnated with carbon black, or may be polyethylene or butyl rubber having incorporated therein carbon black and extruded over the conductor. The metallic return shield for returning current may be copper, or tinned copper, wrapped around the semiconducting layer or may be a copper braid concentrically disposed over said semiconducting layer. The structure may be further enclosed by a jacketing material such as a polyvinyl chloride layer or a metallic jacket. In the cable construction, it is important to eliminate or minimize any voids, such as in the insulation or at the interfaces, which potentially are a source of breakdown. That is, under high-voltage conditions encountered, the voids may ionize thereby leading to the eventual breakdown of the cable.

Cable is tested for voids by an ionization level test. According to a conventional test in the cable industry, at each terminal of the cable the ground shielding means is stripped back to expose the insulation layer. The edge of the ground shielding means is cut uniformly and carefully to avoid nicking the insulation. The raw edge of the ground shielding means is then taped to provide a tight fit to the insulation. There should be no gaps between the ground shielding means and insulation. A tank containing oil is provided with a bottom extension filled with mercury and is insulated from ground. Both terminals are then inserted into the mercury. Voltage is applied through the mercury cup to the cable, and the voltage is increased until ionization occurs. The voltage level at which ionization occurs in the cable coincides with the visual display on an oscilloscope or other suitable instrument. The termini are cut from the cable which, if found acceptable, is then shipped to the customer.

One distinct disadvantage with the oil termination is that the semiconducting layer is attacked or dissolved by the oil thereby releasing the carbon black, or other conductive component. Consequently, the contaminated oil conducts current which gives a false ionization reading. This will be interpreted as a cable failure when in fact it may be a terminal failure.

In an insulated cable such as of the type described above, at or near the termini a high-voltage concentration exists along the edge of the grounded shield which results in ionization or corona discharge. It is known in the art that this ionization may be reduced or minimized by applying a semiconducting coating onto the grounded shield and over a portion of the insulation layer. The coating has a nonlinear current characteristic, and a nonlinear capacitive current is introduced along the coated portion. As a result, a voltage distribution occurs which results in a substantial voltage drop along the insulation layer thereby diminishing the stress concentration near the grounded shield. Hence, the electric field at the termination of the cable is rendered more uniform thereby reducing or substantially eliminating ionization at the terminal. According to U.S. Pat. No. 3,396,231 and U.S. application, bearing Ser. No. 761,614, filed Sept. 23, 1968, and both assigned to the same assignee as this application, a semiconductive coating is applied onto the insulation layer from and in contact with the conductor and the ground shielding means to establish electrical contact therewith. A linear resistive current is introduced to the environment upon the application of voltage which is sufficiently larger in magnitude than the capacitive current so as to overmask the latter and thereby approach a substantially linear current whereby ionization at the terminus is eliminated. However, these prior art methods are disadvantageous in where there is no electrical contact with the conductor corona discharge will occur or in that the coating materials are costly.

It is the purpose of the present invention, therefore, to provide an electric cable terminating means substantially eliminating or inhibiting ionization at the terminus which overcome the disadvantages of the prior art.

The invention, together with its objects and advantages, will best be understood by referring to the following detailed specifications, and to the accompanying drawings, in which.

Figure 1:
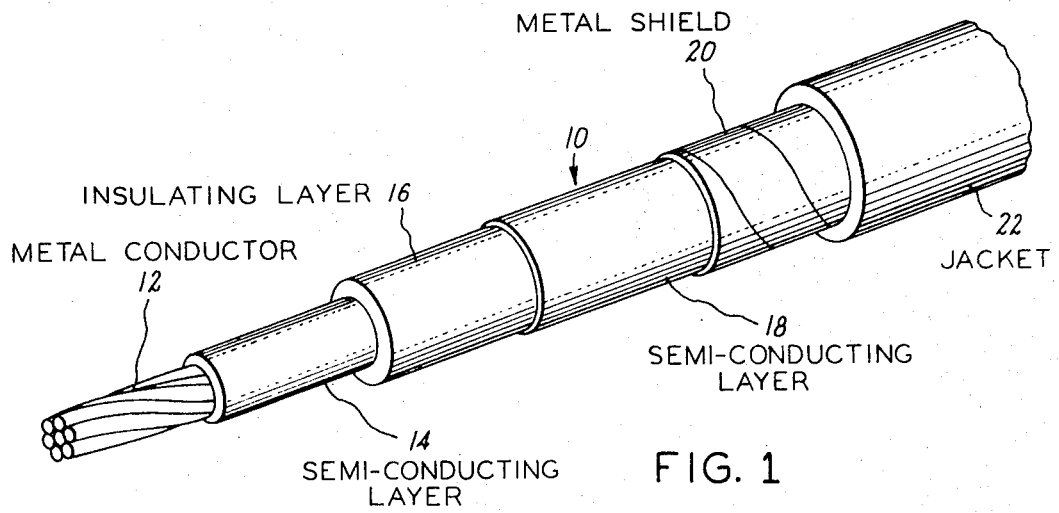
FIG. 1 is a perspective view of a cable of typical construction with portions thereof cut away for the purpose of better illustrating its construction.

In a broad aspect of the invention, I provide cable terminating means characterized by substantially no ionization by applying a semiconductive coating having a nonlinear current characteristic onto the insulation layer of the cable between the high-voltage output end at the terminus and the ground shielding means. The coating extends over the insulation of the cable for a predetermined distance of length, sometimes referred to herein as the termination length, and explained hereinbelow in greater detail. A conductive coating is applied at opposite ends of the semiconductive coating onto the insulation layer to and in contact with the high-voltage output end and to and in contact with the ground shielding means. In this manner, electrical contact is established between the high-voltage output end (i.e., conductor) and the ground shielding means, for if otherwise corona discharge could occur thereby giving a false ionization reading. Upon the application of voltage, a stress graded voltage drop is established along the coated portion of the cable termination from the ground shielding means to the high-voltage output end thereby substantially eliminating ionization in the cable termination.

Referring to the drawings wherein like reference numerals designate similar parts throughout, there is shown a coaxial cable of typical construction indicated generally by the numeral 10, such as might be adaptable for carrying a voltage load of 15 kilovolts, or higher. The cable includes an inner metallic conductor 12 illustrated in the form of a stranded cable, which may be a compact strand, although it should be understood that the conductor 12 may comprise a solid conductor. Generally, a semiconducting layer 14 is applied around the metal stranded conductor for the purpose of establishing a good electrical contact between the conductor and the insulation and further to shield out stresses thereby equalizing all stresses of the individual strands. The metal conductor, with a semiconducting layer applied thereon, is surrounded by a relatively thick insulating layer 16 which is usually applied by extrusion. The insulating material is typically a thermosetting plastic such as cross-linked polyethylene or ethylene-propylene rubber, which may be filled with mineral clay or other suitable fillers. Also, the cable includes a ground shielding means comprising semiconducting layer or tape 18 and a metallic return shield 20, and, overlying this, is outer jacket 22 made of conventional material such as polyvinyl chloride.

Figure 2:
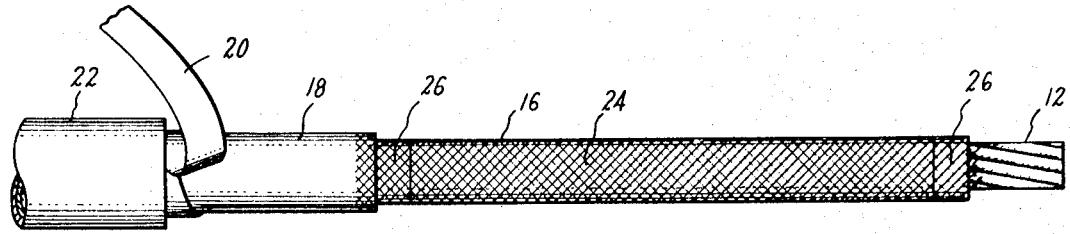
FIG. 2 is a side elevational view of a cable showing a terminating means falling within the scope of this invention.
Figure 3:
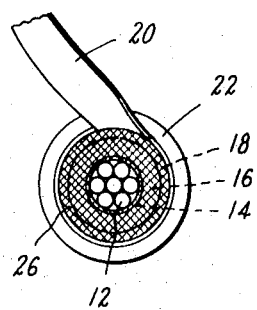
FIG. 3 is a front elevational view of the cable of FIG. 2.

FIG. 2 shows a terminating means prepared in accordance with the invention for an ionization level test. Outer jacket 22 is first stripped from the cable termination for a certain distance. The amount stripped will depend upon the termination length required, as explained hereinbelow, but there is no need to strip from the cable more than an inch or two of the jacket beyond the termination length. The copper shield or tape 20 is then unwound slightly more than the full distance of the termination length to expose the semiconducting layer, and, for ionization testing, the end of the tape is connected to ground. Next, the semiconducting layer 18 is removed substantially the full termination length leaving exposed insulation layer 16. A small portion of the end of insulation layer 16 is removed to leave exposed conductor 12 which thereby extends beyond the marginal edge of the insulation layer, and the semiconducting layer 14 is stripped from the exposed end of the conductor.

The termination length is then cleaned of dirt, grease, oil or other contaminants as by washing the termination with Vythene, carbon tetrachloride or other suitable solvent. After the solvent has dried, the semiconductive coating 24, described in greater detail hereinafter, is applied to the termination length. Coating 24 extends from the ground shielding means along the insulating layer 16 for a predetermined length to the high-voltage output end (i.e., conductor) but contact therewith is not necessary. The coating is applied over the circumference of the insulating layer 16, and where desired, coating 24 may extend over the circumference of the semiconducting layer 18. The coating may be applied with a brush, spraying or other suitable means, and is then permitted to dry as in air.

The semiconductive coating is characterized by a resistance per square having nonlinear current properties. A coating composition comprising particulated nonlinear silicon carbide dispersed in a carrier is especially suitable, but other coating compositions such as boron carbide and metal oxides such as iron oxide may also be used. Chemically pure silicon carbide is an insulator and therefore could not be used without additives which render the composition semiconductive. Commercial grades of silicon carbide contain small amounts of impurities such as aluminum or carbon and therefore possess the desired semiconductive properties. If the resistivity of the coating is too high, the coating will not conduct the current applied during the test operation and flash over or arcing will result. On the other hand if the resistivity is too low short circuit will occur. In the preferred embodiment, the silicon carbide coating is characterized by a resistivity of $10^8$ to $10^9$ ohms per square at a voltage gradient of one kilovolt per inch (one volt per mil). This resistivity decreases up to a maximum of about 10 kilovolts per inch and then remains constant at about $10^6$ to $10^7$ ohms per square.

The silicon carbide, or other nonlinear material, is dispersed in a suitable carrier which is relatively fast drying in air. Typical carriers include, for example, modified phenolic varnishes or epoxy modified varnishes. The varnish is desirably thinned with an organic solvent such as methyl ethyl ketone, toluene or the like.

A conductive coating 26 is applied at opposite ends of the termination length over the circumference of the insulating layer 16 and the semiconducting layer 18 at the one end and the conductor at the other end. The conductive coating should be of sufficient length to assure electrical contact, and desirably this is about one inch. In this manner, the electrical connection is established between the semiconductive coating 24 and the ground shielding means 18 at one end and the semiconductive coating and the conductor 12 at the other end. If the electrical contact is not established, corona discharge will occur. Any coating of sufficient conductivity may be used, and includes, for example, copper paint, silver paint, aluminum paint and the like. The coating comprises particulated metal dispersed in a suitable thinner or carrier. A suitable copper coating comprises 3 parts of copper particles in a lacquer thinner such as methyl ethyl ketone, methyl isobutyl ketone or acetone and has a resistivity of 6 ohms per square at a thickness of 1 mil, at 2 mils of 1.5 ohms per square, and at 3 mils of 1 ohm per square.

In conducting the ionization level test, metallic shield 20 is connected to ground, and a cable lug, which is ionization free, is connected to the metal conductor at each terminus. At least one cable lug is connected electrically to the test equipment. Each cable, depending upon its class and size, must pass established standards with regards to ionization level. In a typical test procedure, voltage is applied to a cable to a high potential level as required by the standard, held there for 5 minutes, and then lowered gradually. If ionization occurs as observed on an oscilloscope or other suitable test apparatus, the voltage is lowered until it is found at what voltage ionization is extinguished. If this occurrence of ionization is at a potential above the required minimum, the cable is passed as satisfactory. Because of my invention, ionization at the terminals is substantially eliminated, and any ionization detected is therefore in the cable. If the cable passes the test, the cable terminations which had been used in the test procedure are cut off, and the remaining portion of the cable is then ready for shipment and installation.

In accordance with the invention, ionization or corona discharge is substantially precluded by grading the electrical stress sufficiently to maintain the stress along the termination length below the ionization start level of the cable. The electrical stress may be calculated from (1) the voltage load for which the cable is constructed to carry, (2) the circumference of the insulation, (3) termination length, and (4) the resistance per square of the coating. In calculating the electrical stress, the load bearing characteristic and circumference of the insulation are set by the cable undergoing testing. The invention is applicable to cable adaptable to carry a voltage of 5,000 volts and above, e.g., 35,000 volts, 69,000 volts and higher. The circumference may vary depending on such factors as the type of insulation used, conductor size, and the like, and generally may have an insulation circumference ranging from about one inch to ten inches. For example, a typical 69 kilovolt power cable, constructed as shown in FIG. 1 and having a mineral filled crossed-linked polyethylene insulating layer, may have a circumference around the insulation of about seven inches.

The termination length may vary depending largely upon the cable size and voltage load bearing characteristic. The heat generated is proportional to square of the current, and therefore a small increase in current can result in high heat losses. If the termination becomes too hot, arcing will occur between the metal conductor and metal shield which will short out the test equipment, i.e., high potential transformer. On the other hand, if the termination is too short, arcing will occur through air between the conductor and metal shield. For conventional high-power cables, such as cable adaptable for carrying high-voltage loads of about 5 through 15 kilovolts, the termination length typically is about 12 inches; for cable having a voltage rating of 35 kilovolts, the termination length is about 24 inches; and for cable having a voltage rating of 69 kilovolts, the termination length is about 36 inches. The termination length may be more or less depending on such factors as voltage load and circumference around the insulation, and may be determined experimentally by one skilled in the art for each production specification of cable.

To further illustrate the invention, cable terminations were prepared in accordance with the invention and tested for ionization. The terminations tested were for cable having a rated voltage of 15 kilovolts, 35 kilovolts, 69 kilovolts and 138 kilovolts, and each were insulated with mineral filled cross-linked polyethylene. The silicon carbide coating comprised 30 grams silicon carbide having a grit size of 400 dispersed in 50 grams of vinyl modified phenolic varnish sold by General Electric Company under the trade designation 7031 and 25 grams of a thinner comprising equal parts by volume of methyl ethyl ketone, butyl cellosolve and toluene. The cable design, termination length and test results are shown in the following table.

TABLE.—IONIZATION LEVEL TESTS FOR GRADED CABLE TERMINATIONS

| Rated voltage, Kv. | Conductor size AWG | Wall thickness of insulation, mil | Outer semi-conducting dusting layer | Return shield | Termination length, in. | Test result, Kv. |
| --- | --- | --- | --- | --- | --- | --- |
| 15 | 2/0 | 175 | Nylon butyl-carbon filled tape | Wire shield | 12 | 41.5 |
| 35 | 4/0 | 270 | Carbon filled cross-linked polyethylene | Copper tape | 24 | 61 |
| 69 | [1] 350 | 650 | ....do.... | ....do.... | 36 | 120 |
| 138 | [1] 500 | 1,000 | ....do.... | ....do.... | 48 | 160 |

[1] Mcm.

The voltage shown under Test Result in the table for each cable is the voltage at which the termination was noise free. It will be observed from the results that the ionization at the termination was substantially eliminated.

I claim:

1. Electric cable terminating means for substantially inhibiting ionization at the termini of said cable comprising an insulation layer surrounding a conductor and a ground shielding means concentrically disposed over said insulation layer, the improvement which comprises: a semiconductive coating applied onto said insulation layer extending for a predetermined length at each terminus between said shielding means and said high-voltage output end, said semiconductive coating having a substantially nonlinear current characteristic upon application of voltage, a conductive coating applied at opposite ends of said semiconductive coating onto said insulation layer to and in contact with said shielding means and said high-voltage output end to establish electrical contact, said semiconductive coating having sufficient resistivity such that upon application of voltage the electrical stress at the surface for said length does not exceed the ionization start level of the cable.

2. Electric cable according to claim 1 wherein said semiconductive coating has a resistance of about $10^8$ to $10^9$ ohms per square at a voltage gradient of one kilovolt per inch.

3. Electric cable according to claim 2 wherein said predetermined length is not less than about 12 inches.

4. Electric cable according to claim 1 wherein said semiconductive coating comprises silicon carbide and said conductive coating comprises copper.

5. Electric cable according to claim 1 wherein said predetermined length is not less than about 12 inches.

6. A method for determining ionization in a cable comprising an insulation layer surrounding a conductor and a ground shielding means concentrically disposed over said insulation layer, which comprises: applying at each terminus a semiconductive coating for a predetermined length onto said insulation layer between said shielding means and said high-voltage output end, said coating having a nonlinear current characteristic upon application of voltage, applying a conductive coating at opposite ends of said semiconductive coating onto said insulation layer to and in contact with said shielding means and said high-voltage output end to establish electrical contact, said semiconductive coating having sufficient resistivity such that upon application of voltage the electrical stress at the surface for said length does not exceed the ionization start level of the cable, and subsequently applying voltage to said cable to measure ionization in said cable.

7. A method according to claim 6 wherein said semiconductive coating has a resistance of about $10^8$ to $10^9$ ohms per square at a voltage gradient of 1 kilovolt per inch.

8. A method according to claim 7 wherein said semiconductive coating comprises silicon carbide and said conductive coating comprises copper.

9. A method according to claim 6 wherein said predetermined length is not less than 12 inches.

* * * * *